(12) United States Patent
Fauchère et al.

(10) Patent No.: US 10,372,812 B2
(45) Date of Patent: Aug. 6, 2019

(54) COMBINING ASPECTS OF A TEMPLATE INTO MULTIPLE WEB PAGES

(71) Applicant: Adobe Inc., San Jose, CA (US)

(72) Inventors: Patrick Fauchère, Basel (CH); Marc Pfaff, Riehen (CH); Lydia Puric, Bottmingen (CH)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/254,886

(22) Filed: Sep. 1, 2016

(65) Prior Publication Data

US 2018/0060294 A1  Mar. 1, 2018

(51) Int. Cl.
G06F 17/30 (2006.01)
G06F 17/24 (2006.01)
G06F 17/22 (2006.01)
G06F 16/958 (2019.01)

(52) U.S. Cl.
CPC .......... *G06F 17/248* (2013.01); *G06F 16/986* (2019.01); *G06F 17/2247* (2013.01)

(58) Field of Classification Search
CPC ............... G06F 17/248; G06F 17/2247; G06F 17/30896; G06F 17/3089
USPC ........................................................ 715/234
See application file for complete search history.

(56) References Cited

U.S. PATENT DOCUMENTS

| | | | |
|---|---|---|---|
| 2007/0016615 A1* | 1/2007 | Mohan | G06F 8/20 |
| 2008/0228867 A1* | 9/2008 | Murphy | G06F 17/30194 709/203 |
| 2014/0108373 A1* | 4/2014 | Abrahami | G06F 17/30893 707/706 |
| 2015/0074516 A1* | 3/2015 | Ben-Aharon | G06F 17/30905 715/234 |
| 2015/0106687 A1* | 4/2015 | McLaughlin | G06Q 30/02 715/234 |
| 2015/0310124 A1* | 10/2015 | Ben-Aharon | G06F 17/248 715/205 |

* cited by examiner

*Primary Examiner* — Scott T Baderman
*Assistant Examiner* — Hassan Mrabi
(74) *Attorney, Agent, or Firm* — SBMC

(57) ABSTRACT

Techniques for combining aspects of a template into multiple pages are described. In implementations, a request is received to generate a web page having digital content (e.g., text, images, videos, and so on) for display. In response to receiving the request, a template to which the web page is bound is selected. The template includes a tree structure having structural content in a first node and policies in a second node. Properties of the structural content of the template are then merged with the digital content of the web page by applying the digital content of the web page on top of the structural content of the template. The web page is then generated based on the merging.

17 Claims, 7 Drawing Sheets

COMBINING ASPECTS OF A TEMPLATE INTO MULTIPLE WEB PAGES

BACKGROUND

Creating a template for a web page using conventional techniques is burdensome because template creation is typically a developer task, which can be complicated, prolonged, and expensive. Users who are not developers are generally not allowed access to create or edit templates. This is because conventional templates are largely composed of scripts and source files, which require developer-level expertise and permissions. Further, conventional templates function as boilerplate and are generally non-editable. For example, when changes are to be made to a template, a new template is created to incorporate those changes. Recreating templates in this way can be expensive and can lead to a large amount of template data.

SUMMARY

This Summary introduces features and concepts of combining aspects of a template into multiple web pages, which are further described below in the Detailed Description and/or shown in the Figures. This Summary should not be considered to describe essential features of the claimed subject matter, nor used to determine or limit the scope of the claimed subject matter.

Techniques for combining aspects of a template into multiple pages are described. In implementations, a request is received to generate a web page having digital content (e.g., text, images, videos, and so on) for display. In response to receiving the request, a template to which the web page is bound is selected. The template includes a tree structure having structural content in a first node and policies in a second node. Properties of the structural content of the template are then merged with the digital content of the web page by applying the digital content of the web page on top of the structural content of the template. The web page is then generated based on the merging.

The techniques described herein enable users to edit template content via a user interface. Edits to the template content are automatically propagated to web pages bound to the template. In addition, initial content from the template can be applied to a newly created web page associated with the template, and the initial content from the template can be subsequently reapplied on demand following any of a variety of different merging strategies.

BRIEF DESCRIPTION OF THE DRAWINGS

Implementations of combining aspects of a template into multiple web pages are described with reference to the following Figures. Entities represented in the Figures may be indicative of one or more entities and thus reference may be made interchangeably to single or plural forms of the entities in the discussion. The same numbers may be used throughout to reference like features and components that are shown in the Figures.

DETAILED DESCRIPTION

Overview

Figure 1:
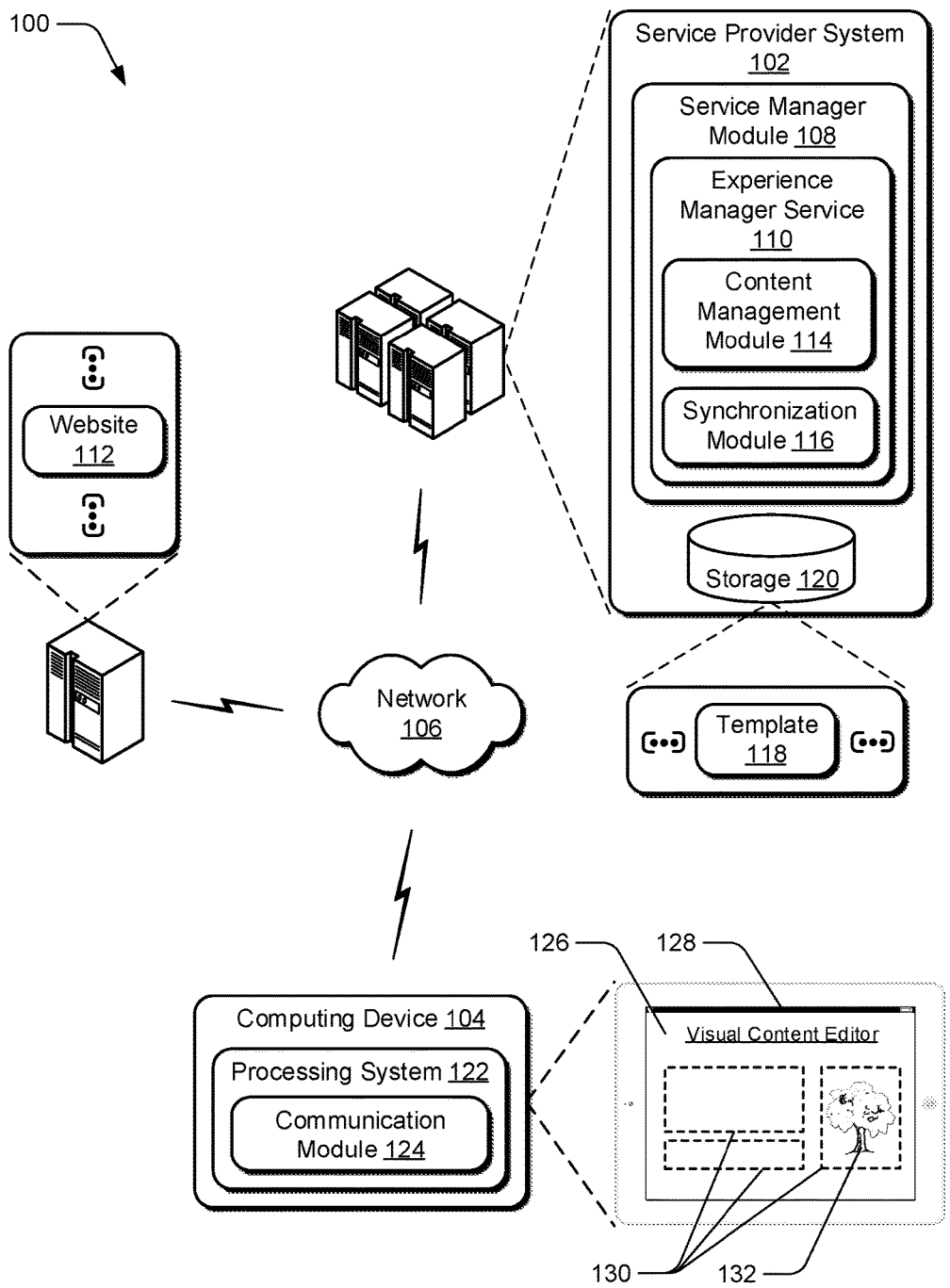
FIG. 1 illustrates an example environment in which techniques for combining aspects of a template into multiple web pages are implemented.

Conventional techniques used for creating and using templates for web pages are burdensome and are generally a developer task, which can be complicated, prolonged, and expensive. Because of the complexity of these conventional techniques, users who lack developer expertise and permissions cannot easily create or edit the templates. Further, any changes made to the templates using conventional techniques cannot be used to update existing web pages.

Techniques for combining aspects of a template into multiple web pages are described herein. In implementations, a template is created similarly to a web page, and both the web page and the template are used as sources of a resulting web page for display. For instance, a template can be created by dragging and dropping items, such as containers, for subsequent use by a web page. The items in the template can either be added to the web page or used as a source of content in a newly created web page. Because the template is structured as a page, the template and the web page can be merged during rendering of the web page to create the resulting web page that is viewable by a user. The merging is performed by applying the web page on top of the template. For example, the web page includes digital content that is applied on top of structural content from the template.

In addition, if the template is modified, such as by adding or removing structural content or changing one or more policies, the modifications can be automatically propagated to the resulting web page and also to any additional web pages bound to the template. Accordingly, the merge is performed each time the web page is rendered for display. The sources (e.g., web page and template) remain as references to the resulting web page, and can be subsequently edited to initiate corresponding changes to the resulting web page. The template is stored in a centralized location to enable the template to be used with multiple web pages, rather than being limited to a single web page.

The techniques described herein allow templates to be created and edited by users who are non-developers. Additionally, these techniques enable edits to the template to be propagated to multiple web pages. Further, structure and content in the template can be intelligently reapplied to the web pages each time the web pages are rendered.

As used herein, the term "digital content" is representative of data, such as text, digital photographs and images, video, audio, and so on. The digital content can be displayed for the user, and can be selectable by the user to perform one or more actions.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that are operable to use the techniques and systems described herein in accordance with one or more implementations.

Example Environment

FIG. 1 is an illustration of an environment 100 in which techniques for combining aspects of a template into multiple web pages can be implemented. The illustrated environment 100 includes a service provider system 102 and a computing device 104 that are communicatively coupled via a network 106. Functionality represented by the service provider system 102 may be performed by a single entity, may be divided across other entities that are communicatively coupled via the network 106, or any combination thereof. Thus, the functionality represented by the service provider system 102 can be performed by any of a variety of entities, including a cloud-based service, an enterprise hosted server, or any other suitable entity.

Computing devices that are used to implement the service provider system 102 or the computing device 104 may be configured in a variety of ways. Computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider system 102 utilized by a business to perform operations "over the cloud" as further described in relation to FIG. 7.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The service provider system 102 is implemented by a computing device to provide one or more network-based services. The services are managed by a service manager module 108 to support a variety of different functionality. The services (e.g., web services), for instance, may be configured to support an experience manager service 110. The experience manager service 110 is configured to manage multiple websites 112, such as by authoring content for pages of the websites 112 and/or publishing the content to make the websites 112 available to consumers. Client devices, such as computing device 104, can interact with the experience manager service 110 via a graphical user interface displayed at the client device.

The experience manager service 110 is illustrated as including a content management module 114 and a synchronization module 116. The content management module 114 is implemented by a computing device to manage content associated with one or more of the websites 112. For instance, the content management module 114 utilizes a template 118 stored in storage 120 to define structural information and policies for pages of the websites 112. In some embodiments, the content management module 114 utilizes content from the template 118 as initial digital content of a newly created page of the website 112.

The synchronization module 116 is implemented by a computing device to propagate changes to the template 118 to existing pages of the website 112. For example, when a user edits the template 118, such as by adding, removing, or repositioning a structural component, the synchronization module automatically propagates those edits to corresponding pages of the website that are bound to the template 118. Further discussion of this and other aspects is provided below in more detail.

Although the storage 120 is illustrated as a component of the service provider system 102, the storage 120 may alternatively be remote from the service provider system 102, or may be a third-party database. The storage 120 may be a single database, or may be multiple databases, at least some of which include distributed data. Thus, a variety of different types of storage mechanisms can be utilized for the storage 120.

In implementations, a user interacts with a computing device 104 having a processing system 122 configured to implement a communication module 124 that supports communication via the network 106, such as with the one or more services of the service provider system 102. As such, the communication module 124 may be configured in a variety of ways. For example, the communication module 124 may be configured as a browser that is configured to "surf the web." The communication module 124 may also be representative of network access functionality that may be incorporated as part of an application, e.g., to provide network-based functionality as part of the application, an operating system, and so on. Thus, functionality represented by the communication module 124 may be incorporated by the computing device 104 in a variety of different ways.

As part of the communication supported by the communication module 124, a graphical user interface (GUI), such as visual content editor 126, may be displayed via a display device 128 of the computing device 104 to enable a user to create and/or edit the template 118. In implementations, the user can interact with the experience manager service 110 via the visual content editor 126 to control structure and layout of the template 118 for use with pages of the website 112. Using the visual content editor 126, one or more structural components, such as containers 130, can be added to the template 118 in accordance with a particular layout. For example, the containers 130 or other items can be added and/or positioned via a drag-and-drop operation. These structural components are configured to be filled with digital content from the web page when the template 118 and the web page are merged to provide a resulting web page for display. In at least some embodiments, the user can add visual content, such as an image, text, and/or video, to be used as initial content for a newly created web page. The visual content 132 from the template 118 is applied to the newly created web page, and can also be subsequently reapplied to that web page. In implementations, an author of the template 118 can choose how to reapply the initial content on a given list of pages by, for example, selecting to override or update unedited content. Accordingly, the visual content editor 126 enables a user to create and modify the templates 118 used to define structural components, policies, and/or initial content of the web page. Further, the user can edit the template 118 without being required to recreate the template 118 or create a new template.

Example Implementation

The following discussion describes example implementations of combining aspects of a template into multiple web pages that can be employed to perform various aspects of techniques discussed herein. The example implementations may be employed in the environment 100 of FIG. 1, the system 700 of FIG. 7, and/or any other suitable environment.

Figure 2:
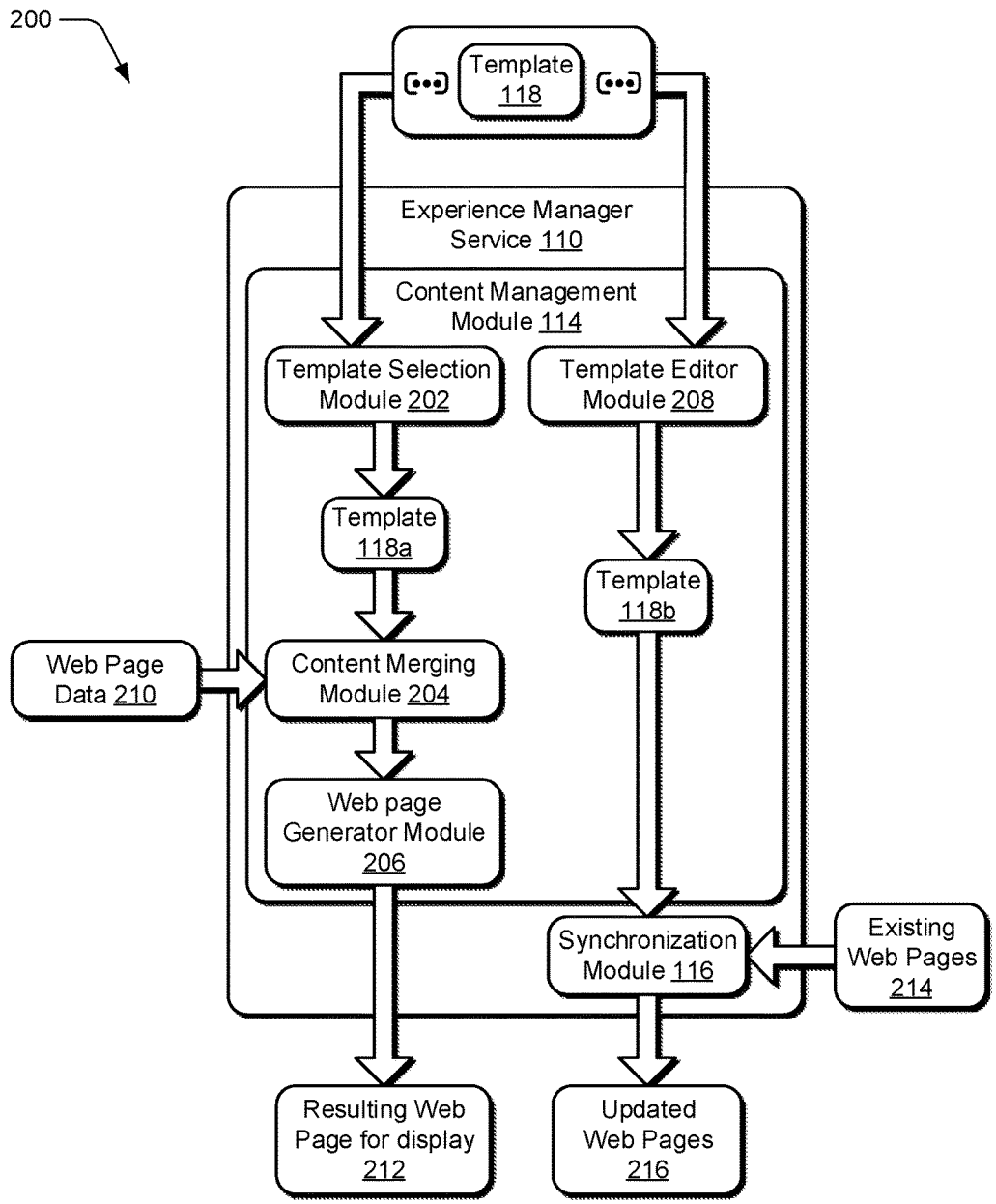
FIG. 2 illustrates an example implementation of an experience manager service at a service provider system from FIG. 1 in more detail.

FIG. 2 illustrates an example implementation 200 of the experience manager service 110 at the service provider system 102 from FIG. 1 in more detail. For example, the experience manager service 110 includes the content management module 114, which is illustrated as including a template selection module 202, a content merging module 204, a web page generator module 206, and a template editor module 208. The template selection module 202 is implemented by a computing device to select, from a plurality of templates 118, a template 118a to which a web page is bound. In implementations, the template 118a is selected in response to a request being received to generate a web page for display, such as at a time of rendering the web page. An example template is described below in further detail with respect to FIG. 3.

The content merging module 204 is implemented by a computing device to merge the selected template 118a with web page data 210 of a web page in accordance with one or more policies in the template 118a. In implementations, the content merging module 204 applies the web page data 210 on top of the selected template 118a. For example, the content merging module 204 is configured to identify a relative path that corresponds to a particular component in the web page that is optionally or potentially located at a reference into the web page and also into the template 118a. Then, the content merging module 204 uses the reference in the web page to override, merge, or apply on top of, the resource located in the template 118a. In this way, aspects that are used twice are replaced. For example, the content merging module 204 overrides a property in the template 118a with a property in the web page, merges a node in the template 118a with a node in the web page, and so on.

The web page generator module 206 is implemented by a computing device to generate the web page for display, such as by rendering the web page. For example, the web page generator 206 utilizes output from the content merging module 204, to generate a resulting web page 212 for display at a client device. The template editor module 208 is representative of functionality to edit the templates 118 based on user input. For example, the template editor module 208 enables a user to make changes to a template 118, such as modifications to the structure or policies of the template, and provide a modified template 118b. Those changes can then be propagated to existing web pages 214 by the synchronization module 116. Accordingly, the synchronization module 116 synchronizes the modified template 118b with the existing web pages 214 to provide updated web pages 216.

Additionally, the template editor module 208 enables a user to create new templates and modify existing templates via a GUI, such as the visual content editor 126 in FIG. 1. For example, the template editor module 208 can generate the GUI for display at the client device 102, such as via a web application, via communications with a client application executed at the client device, or a combination thereof. Accordingly, a variety of different implementations are contemplated for enabling the user to create and/or edit aspects of templates used to combine with web pages. Consider now a discussion of the template used to merge with the web pages.

Figure 3:
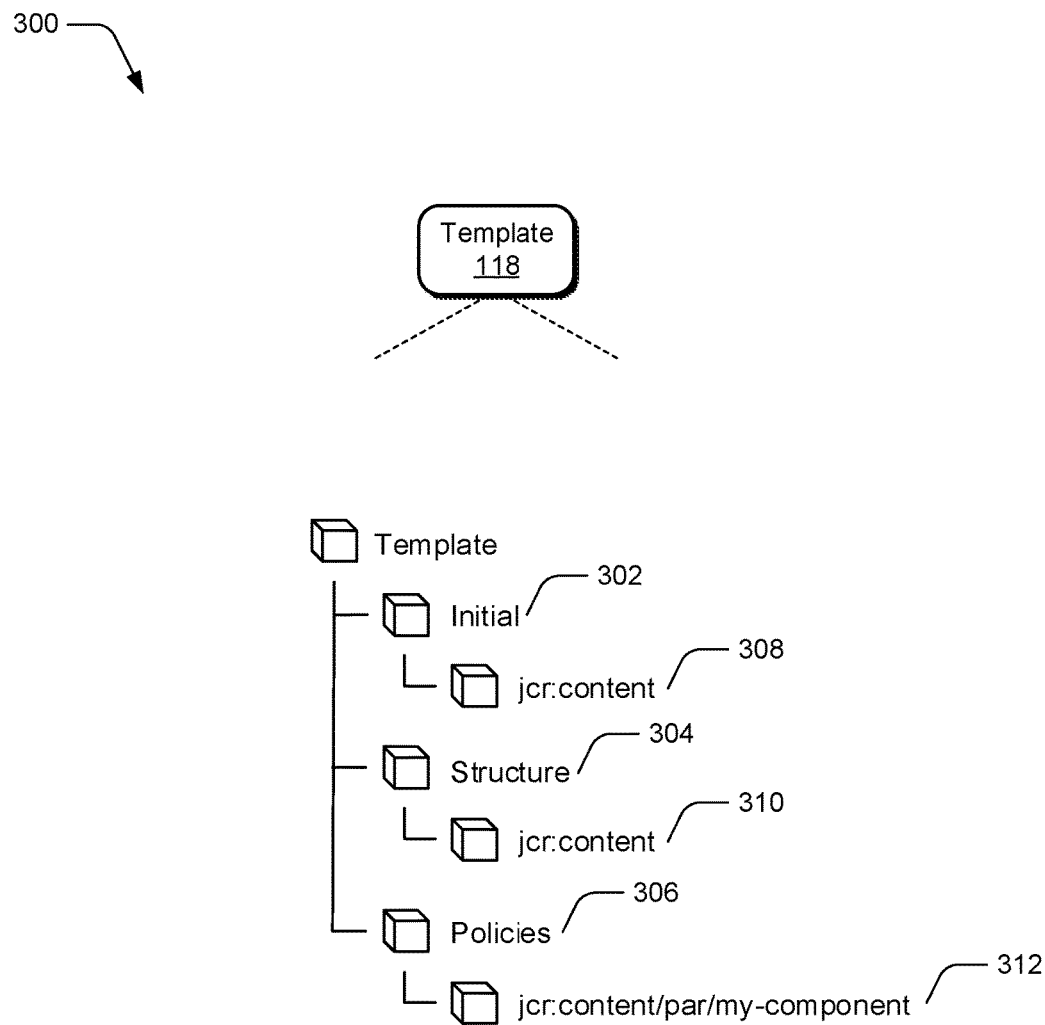
FIG. 3 illustrates an example implementation of an architecture of a template in accordance with one or more embodiments.

FIG. 3 illustrates an example implementation 300 of an architecture of the template 118 from FIG. 1 in accordance with one or more embodiments. In implementations, the template 118 is composed of a data structure, such as a tree structure having a variety of nodes corresponding to different aspects of the template that establish a relation between the template 118 and one or more templated pages. In the illustrated example, the aspects of the template 118 include initial 302, structure 304, and policies 306. The initial 302 is illustrated as including jcr:content 308, which is an application programming interface (API) representing a content repository API for Java (JCR). The JCR is a type of object database tailored to storing, searching, and retrieving hierarchical data. Additionally, the JCR provides APIs for versioning of data, transactions, observation of changes in data, and import or export of data to extensible markup language (XML) is a standard way. The API of the initial 302 is usable as initial content for a newly created web page. The initial content can be edited, such as by removing or adding content or another component. For example, content can be added to a container. In addition, a component can be edited or deleted. Consider, for example, a page that includes a header, a footer, and a content area. The footer and the header may be fixed, or entered as initial content in the template. The footer and the header can be propagated to the pages, inherited by the pages, or merged in the pages. In this example, the content area may be editable via the page while the footer and the header may not be editable via the page. However, using the techniques described herein, the header and the footer are editable by editing the template.

The structure 304 is representative of structural content, such as static content that is not editable on the page itself. The structural content may be present in the page but no access is provided to the user via the page to edit the structural content. Instead, the structural content is editable by editing the template 118. In the illustrated example, the structure 304 includes jcr:content 310, which is an example JCR API representing static structural content.

The policies 306 are representative of design data, such as height or width of an image, or style properties that define various aspects of a style or theme of a page. The policies 306 are also representative of permissions and restrictions associated with the web page or the template 118, or both. For example, the policies 306 can determine operations that can and cannot be performed by an editor of the template 118. In addition, a user authorized to create and edit a template can configure and limit usage of the template. The authorized user can also define a setup for the page, such as a configuration for the page, or allowable operations and edits to the page. In this way, the authorized user configures the template to ensure that associated pages are clean and visually appealing.

Because the various aspects of the template 118 are separate, the policies 306 can be moved and stored in different locations, and can also be used by multiple components. For example, an image and a text can share a same policy, or two different containers in two different pages with two different templates can use the same policy. Accordingly, each policy can be used by a variety of different templates, items, and/or pages.

Further, separating the various aspects of the template 118, as described in relation to FIG. 3, enables the template 118 to be editable. The various aspects of the template 118 are structures rather than flat files, such as css or html files used in conventional techniques. The template 118 is thus similar to a page, and can be considered a non-finished page or a beginning of a page. Then, when the template 118 is merged with the web page, the web page itself can complete the work of generating a resulting web page for display.

Figure 4:
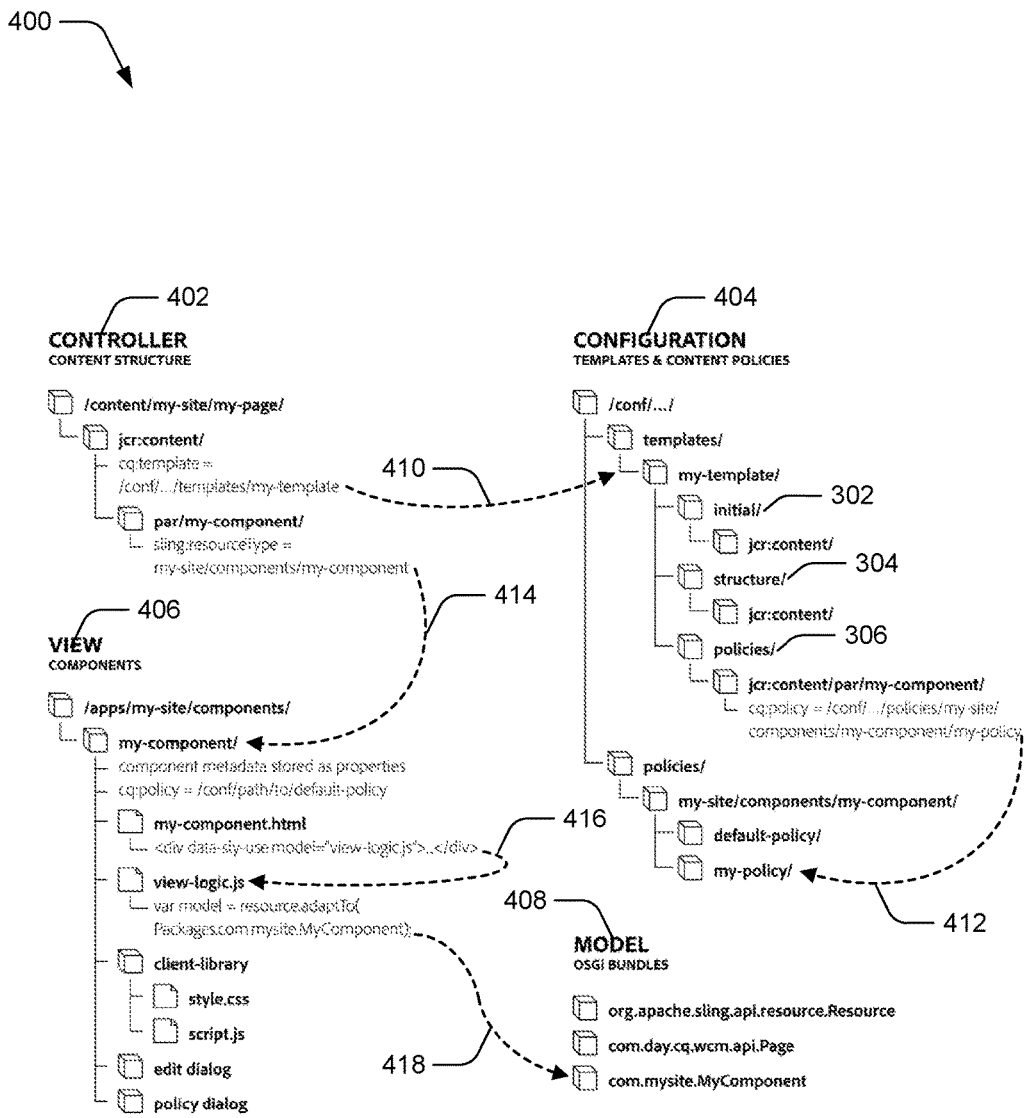
FIG. 4 illustrates an example implementation of combining aspects of a template into multiple web pages in accordance with one or more embodiments.

FIG. 4 illustrates an example implementation 400 of combining aspects of a template into multiple web pages in accordance with one or more embodiments. For instance, the example implementation 400 includes various components, such as a controller 402 (e.g., web page), a configuration component 404 (e.g., template), a view component 406 (e.g., web age digital content), and a model 408. These components each include their own logic and can be individually configured. In addition, these components can be stored in different locations from one another. For example, web page data can be stored in a different location than the template, such as in a different folder, directory, or database.

In the illustrated example, the controller 402 is representative of a web page. When rendering the web page, the controller 402 references the configuration component 404 to obtain configuration data. In the illustrated example, the controller 402 references a template named "my-template" (illustrated by arrow 410). The referenced template is similar to the template 118 described in FIG. 3, which includes initial 302, structure 304, and policies 306 as separate aspects of the template. Here, the template itself is configured to reference policies that may be stored in another location. For example, the "my-template" template is referencing a policy named "my-policy" (illustrated by arrow 412), which is stored in a different location than the template.

In addition, the controller 402 references the view component 406 to obtain web page digital content, such as images, text, video, and so on. In the illustrated example, the controller 402 references a view component named "my-component" (illustrated by arrow 414) to obtain a variety of data including view logic, model data, style data, dialog data, and so on. The view component can further reference the view logic (illustrated by arrow 416), which in turn can reference model 408. For instance, the view logic is referencing a model named "com.mysite.MyComponent" (illustrated by arrow 418).

The model 408 is representative of another configuration component, such as Open Services Gateway initiative (OSGi) bundles, which are a group of classes (e.g., Java® classes) and resources with a detailed manifest file on its contents, and additional services that give the group of classes more sophisticated behaviors, to the extent of deeming the entire aggregate a single component.

The controller 402 is configured to generate a resulting web page for display that includes a merged result between the configuration component 404 and the view component 406, or between the referenced template and the referenced web page digital content. When merging these two resources, the referenced web page digital content overrides, or is applied on top of, resources located in the template.

Example Procedures

The following discussion describes techniques for combining aspects of a template into multiple web pages that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 5:
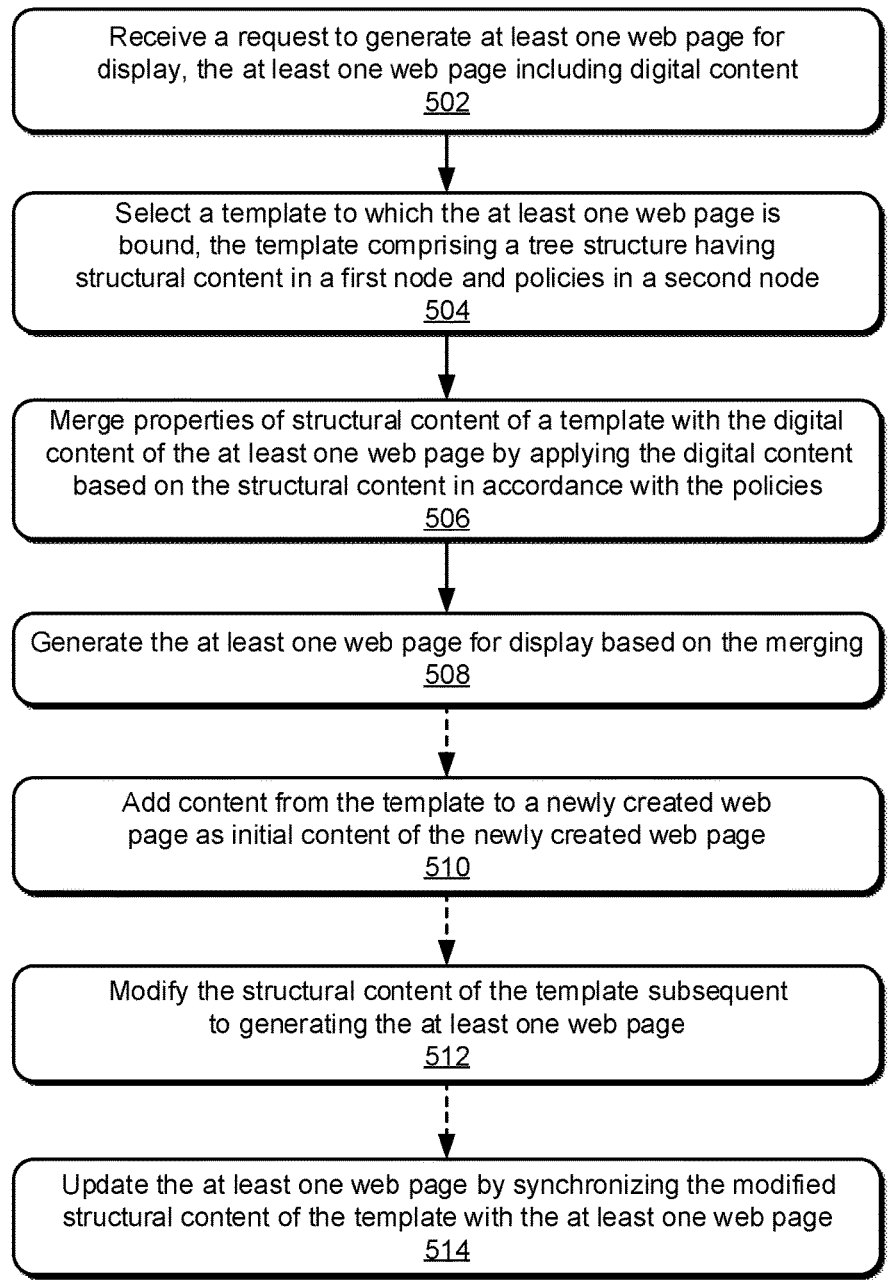
FIG. 5 is a flow diagram depicting a procedure in an example implementation in which techniques for combining aspects of a template into multiple web pages are utilized.

FIG. 5 is a flow diagram depicting a procedure 500 in an example implementation in which techniques for combining aspects of a template into multiple web pages are utilized. In implementations, a request is received to generate a web page for display (block 502). The request may include a browser request to navigate to the web page to display digital content of the web page. In response to the request, a template to which the web page is bound is selected (block 504). The selected template includes a tree structure having structural data in a first node that usable to define a structure and layout of the web page. The tree structure also includes policies in a second node that define design data and permissions associated with the web page, the template, or both. In addition, the tree structure includes content in a third node that is usable as initial content for a newly created web page.

Properties of structural content of a template are merged with the digital content of the web page (block 506). In implementations, the merging occurs by applying the web page digital content on top of the template at the time of rendering the web page for display. The web page is generated for display based on the merging (block 508). This step can be performed in any suitable way, examples of which are described above.

Optionally, content from the template is added to a newly created web page as initial content of the newly created web page (block 510). For example, when creating a new web page, content in the template can be used as the initial content of the page. In at least one example, the initial content includes content to be included in a header or a footer of the page. The initial content can also be subsequently reapplied on demand to the new web page.

The structural content of the template is modified subsequent to generating the web page (block 512). For example, a user can edit the structural content via a template editor. The web page is updated by synchronizing the modified structural content of the template with the web page (block 514). For example, changes made to the template are automatically propagated to the web page. Additionally, those changes are also propagated to any other pages bound to that template. The synchronizing is controlled by the template, such as via restrictions included in the policies.

Figure 6:
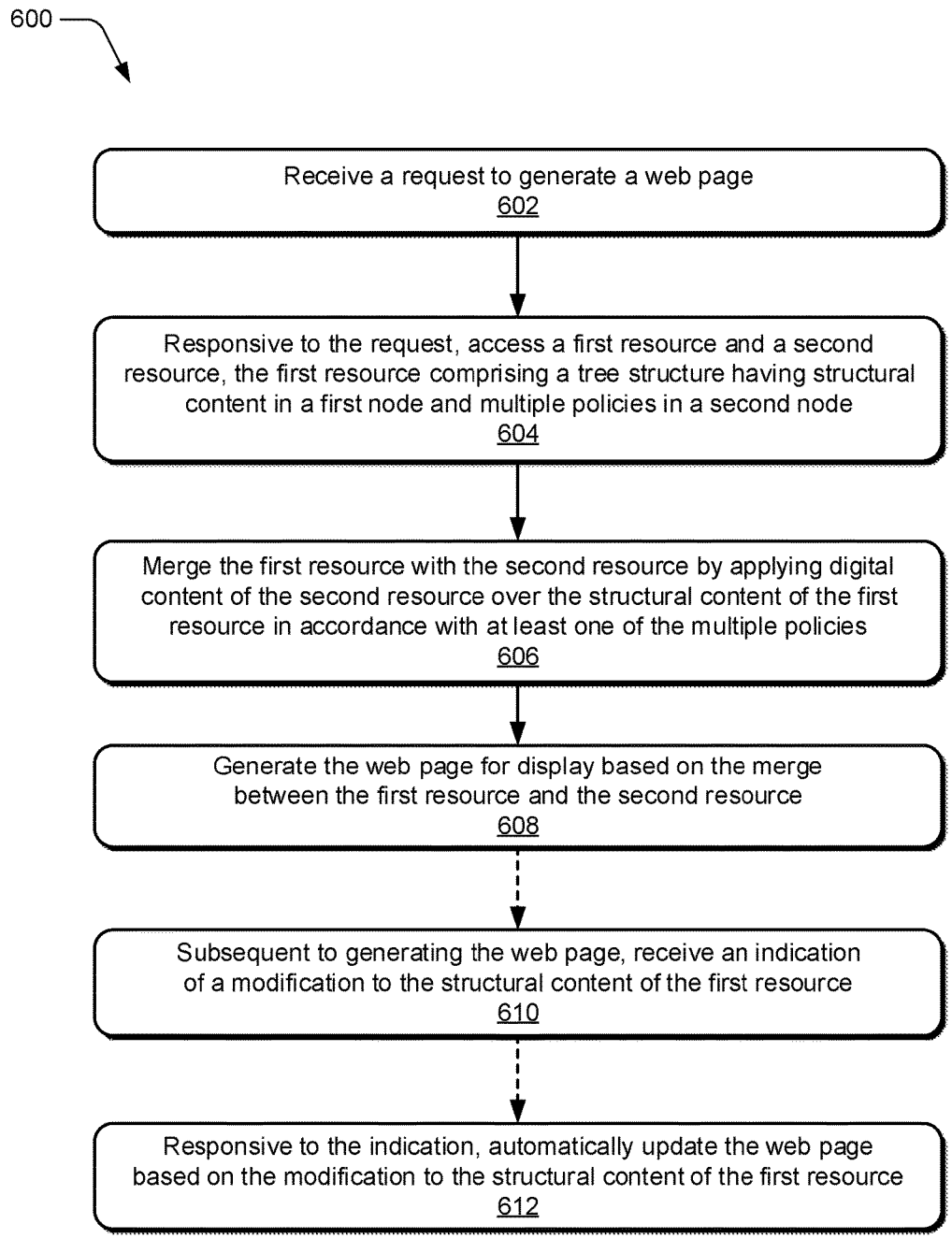
FIG. 6 is a flow diagram depicting a procedure in an example implementation in which techniques for combining aspects of a template into multiple web pages are utilized.

FIG. 6 is a flow diagram depicting a procedure 600 in an example implementation in which techniques for combining aspects of a template into multiple web pages are utilized. A request is received to generate a web page (block 602). In response to the request, a first resource and a second resource are accessed (block 604). In implementations, the first resource includes a template data structure having structural data in a first node and multiple policies in a second node. The second resource includes digital content.

The first resource is merged with the second resource by applying the digital content of the second resource over the structural content of the first resource in accordance with the multiple policies (block 606). The web page is then generated for display based on the merge between the first resource and the second resource (block 608). Subsequent to generating the web page, an indication of a modification to the structural content of the first resource is received (block 610). In response to the indication, the web page is automatically updated based on the modification to the structural content of the first resource (block 612).

Example System and Device

Figure 7:
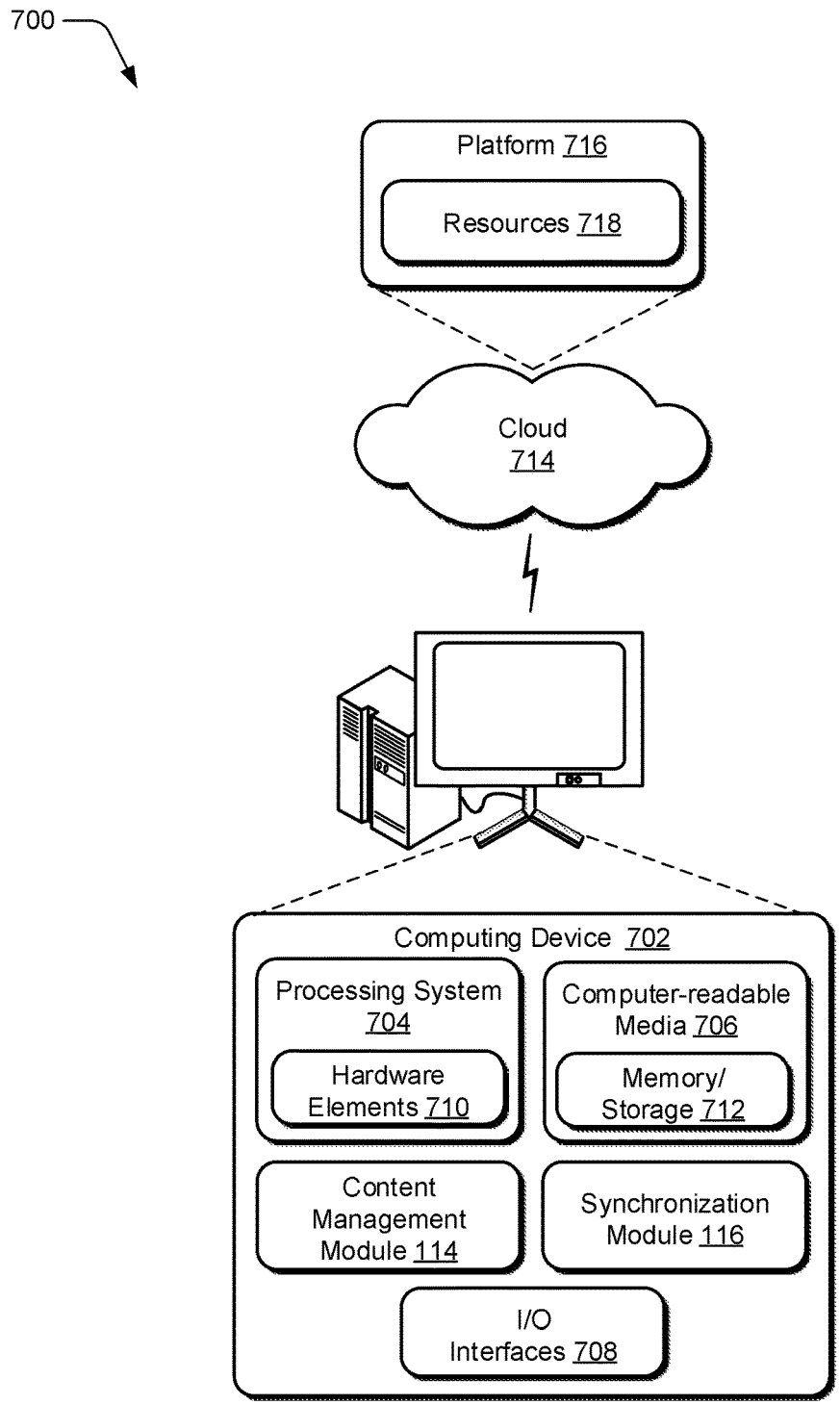
FIG. 7 illustrates various components of an example device that can be implemented as any type of computing device as described herein to implement the techniques described herein.

FIG. 7 illustrates an example system generally at 700 that includes an example computing device 702 that is representative of one or more computing systems and/or devices that may implement the various techniques described herein. This is illustrated through inclusion of the content management module 114 and the synchronization module 116. The content management module 114 may be configured to manage content associated with websites, such as by merging structural content of a template with digital content of web pages. The synchronization module 116 may be configured to automatically update the web pages by synchronizing modifications in the template with the web pages. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

Cloud 714 includes and/or is representative of a platform 716 for resources 718. Platform 716 abstracts underlying functionality of hardware (e.g., servers) and software resources of the cloud 714. Resources 718 may include applications and/or data that can be utilized while computer processing is executed on servers that are remote from the computing device 702. Resources 718 can also include services 720 provided over the Internet and/or through a subscriber network, such as a cellular or Wi-Fi network.

Platform 716 may abstract resources and functions to connect computing device 702 with other computing devices. Platform 716 may also serve to abstract scaling of resources to provide a corresponding level of scale to encountered demand for resources 718 that are implemented via platform 716. Accordingly, in an interconnected device implementation, implementation of functionality described herein may be distributed throughout system 700. For example, the functionality may be implemented in part on computing device 702 as well as via platform 716 that abstracts the functionality of cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate multiple webpages for multiple websites based on a template implemented by at least one computing device, a method comprising:
receiving, by the at least one computing device, a selection of the template having an initial defining a content repository, a policy, and a structure defining structural content defining containers, within which, digital content of the multiple webpages is to be contained in accordance with a layout of the containers;
receiving, by the at least one computing device, an indication of at least one modification to at least one said container or to the layout of the structural content of the template; and
synchronizing, by the at least one computing device responsive to the indication, the at least one modification to the structural content of the template with the multiple web pages of multiple websites.

2. The method of claim 1, wherein the policy defines design data for the multiple web pages.

3. The method of claim 1, wherein the structural content includes static content that is editable via the template but not via a respective said webpage.

4. The method of claim 1, wherein the policy defines permissions associated with a respective said webpage.

5. The method of claim 1, wherein the receiving of the indication of the at least one modification to the template is received via a visual content editor configured to allow items to be added or positioned via a drag-and-drop operation.

6. A system comprising:
at least one processor configured to generate multiple web pages for display by multiple websites, the multiple web pages bound to a template having an initial defining a content repository, a policy, and a structure defining structural content of the template; and
computer-readable storage media storing instructions that are executable by the at least one processor to implement:
a template editor module configured to receive an indication of at least one modification to the structural content of the structure of the template, the structural content defining containers, within which, digital content of the multiple webpages is to be contained in accordance with a layout of the containers; and
a synchronization module configured to synchronize the at least one modification to the structural content of the template with the multiple web pages of the multiple websites.

7. A system as recited in claim 6, wherein the instructions are executable by the at least one processor to implement a content merging module configured to merge the structural content of the template with digital content of a respective web page of the multiple web pages when a respective said webpage is rendered for display.

8. A system as recited in claim 6, wherein the structural content is editable via the template data structure but not via a respective said web page.

9. A system as recited in claim 6, wherein the policy defines design data for the multiple web pages.

10. A system as recited in claim 9, wherein the policy is usable by multiple different containers of the multiple web pages.

11. A system as recited in claim 9, wherein the policy is a single policy usable by multiple components in multiple different pages associated with different templates.

12. A system comprising:
means for receiving a selection of a template having an initial defining a content repository, a policy, and a structure defining structural content of the template;
means for receiving an indication of at least one modification to the structural content of the template configured to generate multiple web pages for display by multiple websites, the structural content defining containers, within which, digital content of the multiple webpages is to be contained in accordance with a layout of the containers; and
means for synchronizing the at least one modification to the structural content of the template with the multiple web pages of the multiple websites in accordance with the policy.

13. A system as recited in claim 12, further comprising means for merging structural content of the template with digital content of a respective web page of the multiple web pages when the respective web page is rendered for display.

14. A system as recited in claim 12, wherein the structural content is editable via the template but not via a respective said web page.

15. A system as recited in claim 12, wherein the policy defines design data for the multiple web pages.

16. A system as recited in claim 12, wherein the policy defines design data for the multiple web pages and is usable by multiple different containers of the multiple web pages.

17. A system as recited in claim 12, wherein the policy defines design data for the multiple web pages and is usable by multiple components in multiple different webpages associated with different templates.

* * * * *